T. L. COWLES.
ADJUSTING DEVICE FOR WIND SHIELDS.
APPLICATION FILED JAN. 15, 1913.
1,100,287.
Patented June 16, 1914.
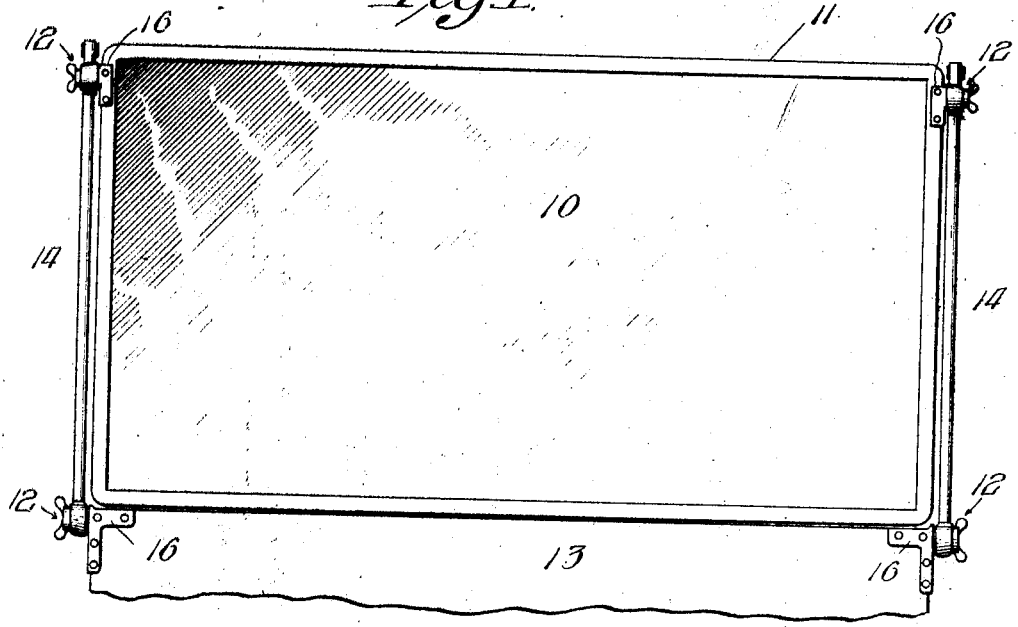
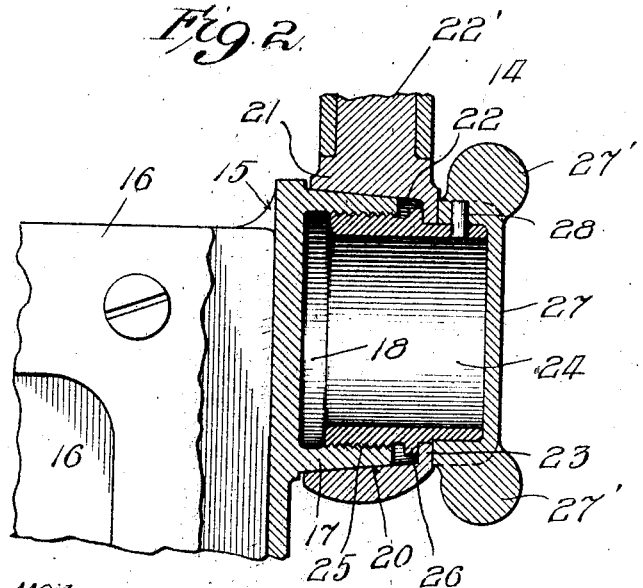
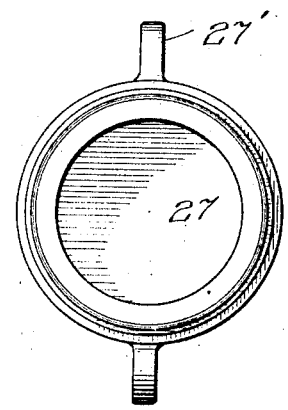
Witnesses:
Harry S. Gaither
E. M. Anderson
Inventor:
Thomas L. Cowles
by Sherididan, Wilkinson, Scott & Richmond
Attys

UNITED STATES PATENT OFFICE.

THOMAS L. COWLES, OF CHICOPEE FALLS, MASSACHUSETTS, ASSIGNOR TO STEVENS-DURYEA COMPANY, OF CHICOPEE FALLS, MASSACHUSETTS, A CORPORATION OF MASSACHUSETTS.

ADJUSTING DEVICE FOR WIND-SHIELDS.

1,100,287.

Specification of Letters Patent. Patented June 16, 1914.

Application filed January 15, 1913. Serial No. 742,169.

*To all whom it may concern:*

Be it known that I, THOMAS L. COWLES, a citizen of the United States, residing at Chicopee Falls, in the county of Hampden and State of Massachusetts, have invented certain new and useful Improvements in Adjusting Devices for Wind-Shields, of which the following is a specification.

This invention relates to improvements in vehicle wind shields, and has for its object to provide an improved form of adjusting device for use in connection with a wind shield, which will permit ready adjustment of the same and locking in adjusted position.

Other objects of the invention will be made apparent and set forth in the following specification taken in connection with the accompanying drawing, in which—

Figure 1 is a front elevation of a wind shield embodying my invention. Fig. 2 is a detail section through the fastening device; and Fig. 3 is an end elevation of the operating member and cap secured thereto.

Like numerals refer to like elements throughout the drawings, in which—

10 designates a glass dust or wind shield surrounded by an inclosed tubular metal frame 11. At convenient parts are located adjusting and locking members, generally indicated by the numeral 12, one pair being secured to the dash member 13 of the vehicle and the other pair to the frame 11 of the wind shield proper. Pivotal arms 14 extend between the pairs of upper and lower adjusting members 12, as shown in Fig. 10. The wind shield may be adjusted by its connection to the upper member, or may be moved bodily with the arms 14 about their connection with the lower of the members 12, or both adjustments may be combined as desired.

The adjusting and locking members comprise the use of a socket member 15, having a pair of rearwardly extending spaced flanges 16 adapted to be secured in the one case to the metal frame 11, and to the sides of the dash member 13 in the case of the lower member 12. The socket member is formed further with a socket portion 17 having an internal socket therein and formed with its outer periphery 20 tapered, as shown in Fig. 2.

What I term a sleeve member 21 is provided with a tapered opening 22 therein, the inner wall of which is adapted to closely fit on and frictionally engage the tapered exterior of the socket portion 17. An inturned shoulder or flange 23 is located at the smaller end of the tapered opening. What I term the operating member is indicated by the numeral 24, and comprises preferably a short tubular or cylindrical member provided with the externally threaded portion 25 and the flange or shoulder 26 extending around its periphery intermediate its extremities. This shoulder is adapted to abut against and closely fit the flange 23 of the sleeve member, the inner edge of said flange closely fitting the outer periphery of the operating member, as shown in Fig. 2. A cap 27 fits over and around the operating member at one extremity thereof, and is secured thereto by a pin 28, or other suitable fastening means. The end of the cap is adapted to abut against the side of the shoulder 23 of the sleeve member 21 at the opposite side from the shoulder 26 of the operating member 24.

It will be apparent that the cap and flange serve to retain the operating member on the sleeve member in such manner as to prevent withdrawal thereof, but so as to permit relative rotation with respect thereto. The dimensions of the operating member and inturned flange are such as to leave a space between the threaded portion of the operating member and the tapered inner wall of the sleeve member. The inner wall of the socket 18 of the socket portion 17 is similarly threaded and is threadedly engaged by the operating member. In the construction shown the sleeve member is provided with the upwardly extending stem 22, adapted to sit in or otherwise be braced to the arm 14.

To lock the sleeve 22, and consequently the arm 14, to the socket member 15, the wings 27' of the cap 27 are grasped, and the latter is rotated to advance the operating head, and consequently the sleeve, toward the socket member, the tapered contacting faces providing a frictional contact which may be increased according to the relative movement toward each other of the socket and sleeve members, thus serving to hold the same locked in adjusted position until a reverse rotation of the cap occurs, when the members will be positively unlocked.

The operation of the adjusting and locking device is believed to be clear from the above description. The lower set of members 12 may be adjusted to move the arms 14, together with the shield 10, or the upper set of locking members may be adjusted to permit movement of the shield relative to the arms 14, or both adjustments may be made simultaneously.

It will be apparent that I have provided an improved form of wind shield embodying an adjusting and fastening means which will positively lock or unlock the members as desired.

While I have shown and described my invention with more or less particularity, I do not wish to be unduly restricted thereto beyond the scope of the appended claims.

What I claim is:—

1. In a device of the class described, a socket member and a sleeve member, said sleeve member fitting around and adapted to frictionally engage said socket member to prevent relative rotation thereof, said socket member being provided with an internally threaded socket or aperture, an operating member rotatably carried by the sleeve member and threaded to engage the threaded aperture of said socket whereby rotation of the operating member will positively move said socket and sleeve members together or apart, and means whereby said sleeve member may be detached from said socket member without altering the adjustment of said operating member.

2. In a device of the class described, a socket member provided with an internally threaded socket or aperture, a sleeve member fitting around said socket member and adapted to frictionally engage the latter, an operating member rotatably carried by the sleeve member and threaded to engage the threaded aperture of said socket member, said sleeve member being provided with an inturned flange and said operating member being provided with a shoulder abutting against said flange, and operating means secured to said operating member on the opposite side of and abutting against said flange.

3. In a device of the class described, a socket member having an internally threaded socket therein and a tapered cylindrical outer surface, a sleeve member provided with an aperture therethrough, the inner wall of said aperture being tapered to closely fit and frictionally engage the tapered surface of the socket member, said sleeve member being provided with an inturned flange adjacent the end of said aperture, an operating member rotatably carried by said sleeve member and having a shoulder abutting against one side of said inturned flange, and a cap secured to said operating member and having its inner edge fitting against the opposite side of said flange, said operating member being provided with an externally threaded portion adapted to threadedly engage the threaded portion of said socket member.

In testimony whereof, I have subscribed my name.

THOMAS L. COWLES.

Witnesses:
E. M. ANDERSON,
HENRY A. PARKS.